March 16, 1937. E. ATTESLANDER 2,073,774
LOCOMOTIVE CONTROL
Filed July 17, 1935 3 Sheets-Sheet 3
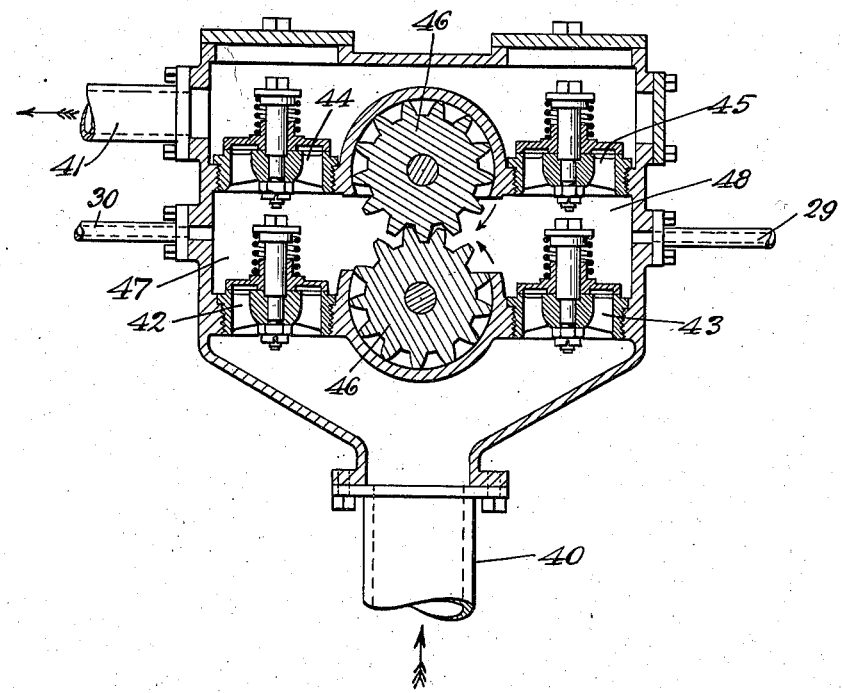
Inventor
Edouard Atteslander
by Parker + Carter
Attorneys Patented Mar. 16, 1937

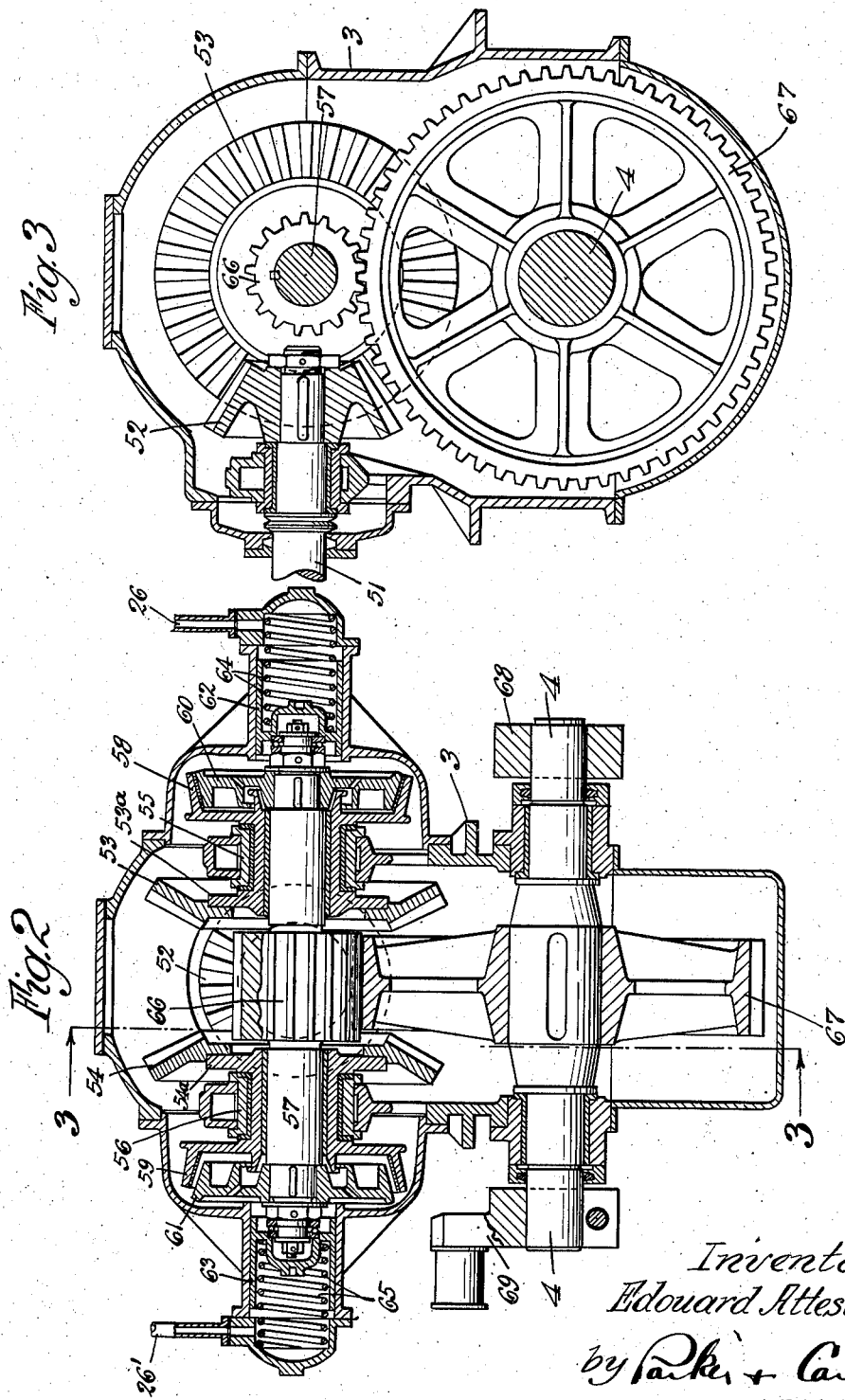

2,073,774

UNITED STATES PATENT OFFICE 2,073,774

LOCOMOTIVE CONTROL

Edouard Atteslander, Winterthur, Switzerland, assignor to Sulzer Freres, Societe Anonyme, Winterthur, Switzerland Application July 17, 1935, Serial No. 31,941
In Switzerland July 21, 1934

20 Claims. (Cl. 192—.01)

This invention relates to the combination in an automotive vehicle, such for example as a locomotive driven by an internal combustion engine, of driving means including a special clutch mechanism, whereby the vehicle is driven either in forward or in reverse by the engine, and whereby the engine may be used for braking. This latter feature is of particular importance, of course, where the vehicle is moving down grade.

The invention, therefore, has for one object to provide an internal combustion locomotive having a clutch and transmission by means of which the engine drives the vehicle either forward or reverse.

Another object is to provide in connection with such an engine and transmission means whereby the engine itself is effective for braking.

Another object is to provide in connection with such a mechanism an automatic blocking or controlling device which, upon the operation of the brakes, automatically connects the clutch corresponding to the direction of travel and automatically blocks or locks the clutch for the other driving direction, into disengaging position and holds it in that position until positive manipulation of the control mechanism.

This invention differs from the standard automobile practice in which engines may be used for braking, because in automobiles there is only a single clutch for use in both driving directions. In the present invention there are two clutches, one for forward and one for reverse, and only one is ever used at a time for transmission of power to the wheels of the locomotive.

A further object of the invention is to provide in the control mechanism automatic means to prevent the actuation of the brake while fuel is being fed to the engine and to prevent the feeding of fuel to the engine while the latter is being used for braking. A still further object is to provide a power accumulator in connection with the control mechanism of the locomotive which, even when the engine is stopped, continues the operation of the blocking device. The same result could be accomplished by the use of an auxiliary engine. One form of power accumulator which may be associated with hydraulic means for transmitting impulses to the blocking device comprises an elastically loaded or weighted accumulator which maintains the operation of the blocking device when the internal combustion engine is not operating. In this connection the expression "hydraulic means" is to be taken as including not only means for transmitting liquid pressure but fluid pressure of any sort.

The invention is illustrated more or less diagrammatically in the accompanying drawings, wherein:—

Figure 2 is a transverse vertical section on an enlarged scale, taken at line 2—2 of Figure 1;

Figure 3 is a longitudinal vertical section on an enlarged scale, taken at line 3—3 of Figure 2;

Figure 4 is a transverse vertical section on an enlarged scale, illustrating the pump.

Like parts are designated by like characters throughout the specification and drawings.

Figure 1:
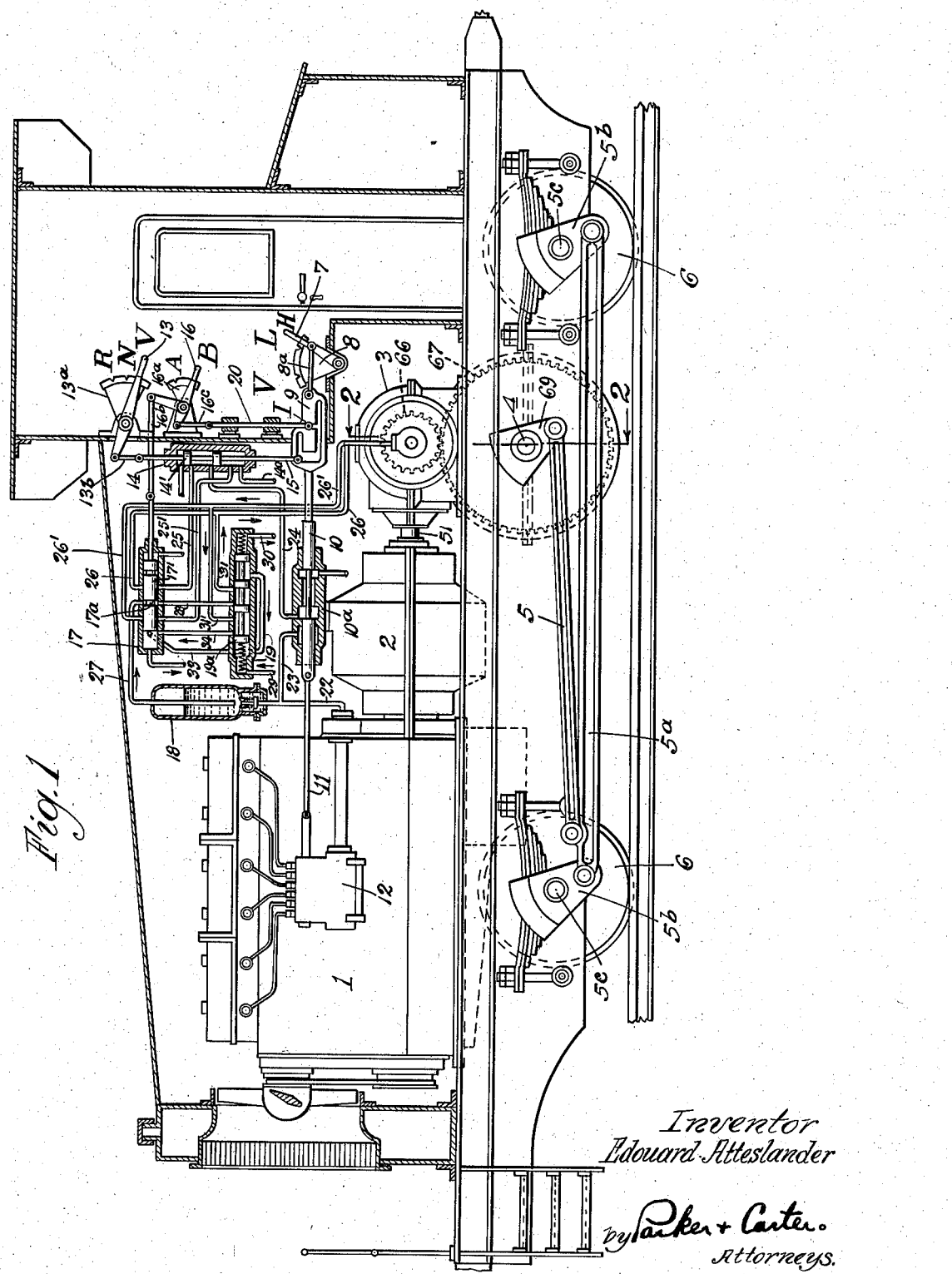
Figure 1 is a longitudinal vertical section of a locomotive driven by an internal combustion engine in which view certain parts are in section, certain parts are broken away and certain parts appear in elevation.

In Figure 1 there is illustrated a locomotive having a suitable frame, housing and wheels, the particular details of which form no essential part of the present invention which can be applied to a wide variety of vehicles.

I is an internal combustion engine which transmits power to the wheels and which, as above suggested, is used both for driving the vehicle and to assist in braking it. 2 is a hydraulic transmission. 3 is a gear housing containing a reverse gear driving a jack shaft 4 which carries cranks 68, 69, to which are attached push rods 5, which at their opposite ends are attached to pull rods 5a. The pull rods 5a are attached to cranks 5b on shafts 5c which carry flanged wheels 6.

The invention is not limited to the particular form of running gear illustrated, nor is it limited to any particular means for driving the wheels or the axles of the locomotive, and the form shown is merely illustrative of one means by which the wheels may be driven.

The locomotive control mechanism by means of which the clutches, the reverse gears and the blocking or latching mechanism are operated includes three levers; a lever 7, which controls the quantity of fuel and thus controls the engine; a reverse lever 13 which controls the reverse gears 3 and a brake lever 16 which controls the braking device 17. The speed or fuel lever 7 has positioned near it a quadrant 8 and through a link 8a is attached to a slotted cam member 9 which is connected to a piston valve 10 mounted for reciprocation within a housing 10a and connected at its opposite end to a link or rod 11, which is connected to operate the control of a fuel pump 12.

The reverse lever 13 has positioned near it a quadrant 13a and the lever is connected by means of a link 13b to a piston valve 14' which is positioned within a suitable housing or control cylinder 14. At its lower end the valve is connected to a rod 15 which engages the slot in the slotted cam plate 9.

The brake lever 16 is associated with a quadrant 16a. One end of the lever 16 is connected to a link 16b which is connected to a piston valve 17' which itself is mounted for reciprocation within a housing 17. A link 16c is secured to a continuation of the lever 16 and attached to a rod 20 which at its lower end engages the slot of the slotted cam plate 9.

Before describing the hydraulic and mechanical transmissions by means of which the movements of the control levers 7, 13 and 16 are effective to operate the clutches, brakes and associated parts, those parts themselves will be described directly as illustrated in Figures 2, 3 and 4.

As shown in the drawings the control members and the clutch are in the position for driving the locomotive in the forward direction. As a means of furnishing fluid pressure for operation of the controls, a pump may be used and there is shown in Figure 4 a gear pump suitable for this purpose, which may be driven directly or indirectly from any suitable source and is positioned at any suitable place in the locomotive. The pump draws in liquid such, for example, as oil, from a reservoir through a pipe 40 and discharges it through a pipe 41 to places where lubrication is desired, for example, to the gears and bearings of the locomotive, the transmission or the engine. Whether the direction of rotation is forward or reverse, the liquid is drawn in always through the pipe 40 and discharged through the pipe 41. Since, however, two directions of rotation are contemplated, two suction or intake valves 42, 43 and two corresponding pressure or discharge valves 44, 45 are provided. When the gears 46 are turning as indicated by the arrows in Figure 4, the fluid is drawn in through the pipe 40, through the valve 42 and discharged through the pressure valve 45 and finally through the outlet connection 41. If the direction of rotation of the gears be reversed the valves 42 and 45 remain closed and the valves 43 and 44 function, the valve 43 permitting the entry of fluid and the valve 44 permitting its discharge. Upon a change of direction of rotation of the gears the pressure in the spaces or chambers 47 and 48 is changed from suction pressure to feeding pressure and vice versa, so that for the direction of rotation shown by the arrows there is suction pressure in the space 47 and feeding or discharge pressure in the space 48. For a reverse direction of the arrows there would then be suction pressure in the space 48 and feeding pressure in the space 47, and these pressure conditions and the variation in the pressure conditions are effective to operate certain of the controls in a manner to be described below. The spaces 48 and 47 are connected for the transmission of pressure impulses through the pipes 29 and 30, respectively, with the blocking or latching device associated with the locomotive control so that they affect that device depending upon the direction of rotation of the gears.

The parts within the housing 3 shown in Figure 1 are illustrated in detail in Figures 2 and 3. As shown in Figure 3 a shaft 51, which is driven by the engine, has keyed upon it a beveled gear 52 which meshes with two beveled gears 53 and 54 carried, respectively, in suitable bearings 55 and 56. Each of the gears 53 and 54 is secured, respectively, to a hub 53a and 54a. A shaft 57 passes through the two hubs 53a and 54a. At its outer end the hub 53a carries a clutch cone 58 and at its outer end the hub 54a carries a clutch cone 59, so that the beveled gear 53 is fixed rigidly to the cone 58 and beveled gear 54 is fixed rigidly to the cone 59. The corresponding counter cones 60 and 61 are keyed or otherwise rigidly secured to the shaft 57.

The shaft 57 is mounted for limited floating movement within the hubs 53a and 54a, in other words, it may be moved laterally with respect to these hubs. To control the position of the shaft and to effect its lateral shifting two plungers 62 and 63 are provided at opposite ends of the shaft, and bearing against it with suitable anti-friction bearings provided between the plungers and the ends of the shaft. There is a spring 64 within the plunger 62 and a spring 65 within the plunger 63. If there is no hydraulic pressure on either of the plungers the springs being balanced exert an equal pressure upon the shaft and hold it in a central position. Connected to the housing to communicate pressure to the plunger 62 is a pipe 26. A similar pipe 26' is connected to the housing to communicate pressure to the plunger 63. The details of the means for producing pressure and for causing it to be effective through the pipes 26 and 26' to effect movement of the shaft 57 and consequent clutch engagement and disengagement will be described below.

It will be understood that when the engine is in motion and when the position of the shaft 57 is such that one or the other of the clutches is engaged, the shaft 57 will rotate, carrying with it the pinion 66 which is keyed on it. This rotation is communicated to the gear 67 which is keyed on the jack shaft 4 and through the rotation of which the wheels of the locomotive are caused to rotate. Crank arms 68 and 69 are attached to the jack shaft 4, and rotating with it, transmit movement to the rods 5 and 5a.

Considering now the operation of the device and particularly the operation of the controls, the gear 53 in co-operation with the clutch 58 and 60 serves to drive the vehicle for forward movement and as shown the clutch parts 58 and 60 are engaged to effect the forward movement. The control members shown in Figure 1 are shown in the position for brake operation in connection with forward drive. With the parts in the position shown in Figures 2 and 3 the gears of the pump shown in Figure 4 are turning in the direction of the arrows of that figure and there is thus in the space 48 a feeding pressure so that pressure is built up which is transmitted through the conduit 29 shown in part in Figure 4 and communicated through that conduit to the clutch selector housing 19, the conduit 29 being connected to the left side of that member. The conduit 30 is connected to the right side of the member. Therefore, when pressure is built up in chamber 48 and communicated through the conduit 29 to the left side of the selector 19 the piston valve 19a within the selector is displaced to the right. This action is caused not only by the pressure within the chamber 48 but by the negative pressure within the chamber 47, which, through the pipe 30, is connected to the right hand end of the selector 19.

To cause brake operation in connection with forward drive, the speed control lever 7 is placed in the stop position H, as shown in Figure 1, and in that position fuel is no longer fed to the engine. The slotted cam plate 9 being connected by the link 8a to the lever 7, is drawn into and held in that position shown in Figure 1. With the cam lever in this position the slot I is brought in line with the member 20, the end of which may thus enter it, so that the brake control lever 16 can be moved from the "out of operation" position A to the brake position B. So long as the brake lever 16 remains in the position shown in Figure 1, the cam cannot be moved into the position to permit feeding of fuel to the engine, and thus, once it has assumed the position shown in Figure 1, the brake lever 16 locks the cam in place and prevents manipulation of the fuel or speed lever 7.

When the brake lever 16 is moved to the position B it not only locks the cam plate 9, as above described, but through the link 16b it moves the piston valve 17' of the braking device and carries it to the right to the position shown in Figure 1.

The braking device 17 is associated by conduits and in a manner to be described below, with the clutch selector 19, which is associated with the pump of Figure 4, through the conduits 29 and 30. By means of these parts when the braking device is operated that clutch is automatically engaged which corresponds to the direction of rotation and the other clutch is automatically blocked out and held in the disengaged position. The slotted cam plate 9 also serves as a blocking device since the operation of the braking device through the braking lever 16 is prevented at all times except when the cam has been drawn to the position shown in Figure 1 to stop feed of fuel to the engine and only at that time can the end of the rod 20 enter the slot I in the cam plate to permit movement of the lever 16 and operation of the braking device. Correspondingly when this movement has occurred and when the end of the rod 20 has entered the slot I, because the braking device has been operated, movement of the cam plate 9 to cause feeding of fuel to the engine cannot be accomplished until the braking device has been operated again to remove the braking effect. Then and then only is the rod 20 moved out of the slot I to permit movement of the cam plate to cause the admission of fuel to the engine.

The reversing lever 13 is still as shown in Figure 1 in position V for forward driving, in the position which it occupied when the locomotive was to be driven forward. It might, however, without influencing the brake mechanism, be in the position R, for reverse drive, or in the position N for neutral or complete disengagement of the clutch.

Since the control system in the particular form shown herewith is hydraulic it is necessary to furnish liquid under pressure for the operation of the system and fluid under pressure may thus be furnished by any pump associated with and driven by the engine, for example, a lubricating pump, and fluid under pressure flows from this pump through the pipe 22, first through a pressure accumulator 18, within which fluid is accumulated under pressure for operation during times when the engine is stationary and when the lubricating pump is, therefore, also stationary the accumulator 18 thus constitutes an auxiliary means for operating the controlling mechanism when the lubricating pump is stationary. From the accumulator 18 the fluid passes through a conduit 27, to the housing 17 and past or through a groove 17a in the piston valve 17' through the conduit 28 into the clutch selector 19. The piston valve 19a within the clutch selector housing 19 has been moved to the right by pressure generated within the chamber 43 during the forward rotation of the gears 46 as shown in Figure 4, this pressure passing through the conduit 29 to the housing 19. With the piston valve in this position a path is provided from the conduit 28 through a portion of the housing 19, thence through the conduit 31 to the conduit 26 which, as shown in Figure 2, is in communication with the right side of the gear housing 3 and pressure flowing through the conduit 26 enters the cylinder within which the piston 62 is positioned and is effective to move the shaft 57 to the left as shown in Figure 2, and to bring the clutch 58, 60 into engagement. Thus the driving parts are in position for forward driving and the other clutch 59, 61 is locked out of engagement and held in the disengaged position.

If at this time as a result of stopping of the internal combustion engine because the fuel supply is cut off when the fuel lever is in position H as shown in Figure 1, the lubricating pump no longer furnishes fluid under pressure to the conduit 22. The necessary pressure liquid for operating the controls is furnished from the pressure accumulator 18 which was filled during the time of engine operation. This liquid is now discharged through the conduit 27 under the influence of the air or gas cushion which has formed above the liquid in the accumulator 18. This air or gas cushion is effective upon the liquid accumulated to furnish the necessary pressure impulses for the operation of the braking device and of the control system generally. As soon as the internal combustion engine is driven again after it has for any reason been stopped, liquid is again forced into the accumulator 18 from the conduit 22 from the lubricating pump or from whatever source is provided.

Since the braking operation is normally carried out when the locomotive is in motion and it is desired to bring it to a stop, it may be assumed that when the parts were moved into the position shown in Figure 1 the locomotive was in operation. Hence even though the engine be stopped by stopping the feeding of fuel to it, the vehicle will for a while continue to move as a whole in the direction in which it was moving when the braking operation was commenced, that is to say, when the various control parts were moved into the position shown in Figure 1. With the parts in this position and with the parts of Figure 2 in the position shown therein, even though feeding of fuel to the engine has been discontinued, it remains connected to the axle and, therefore, the forward movement of the vehicle is effective through the axles 5c, the rods 5 and 5a, the jack shaft 4, the reverse gear 3 and the driving gear 2 to drive the engine. The effort necessary to accomplish this driving of the engine, to overcome friction of the parts driven, and to compress air in the working cylinders, is all work which affects the braking operation.

Since before the brake lever 16 is set to the braking position the fuel or speed lever 7 must be moved to the stop position H, this also moves the piston valve 10 to the position shown in Figure 1 and cuts off the flow of fluid pressure from conduit 23 to conduit 24, but the discharge conduit 14a from the control cylinder 14 remains open for the discharge of fluid to a reservoir or to any other suitable point in the pressure system. Since when the parts are in the braking position and in particular when the cam 9 is in the position shown in Figure 1, the conduits 25 and 25' are cut off, respectively, from the conduits 26 and 26' by the valve 17', the position of the reverse lever 13 is unimportant and cannot alter the braking effect and variations in the position of the reverse lever 13, and consequently of the valve 14', will not effect a change in the engagement or disengagement of the clutches.

The braking effect has been described above as in connection with the forward movement or forward drive, but it can equally well be applied for similar braking during reverse drive or reverse movement. When this takes place the clutch selector valve 19a has been displaced to the left from the position shown in Figure 1 and, therefore, fluid under pressure which has reached the housing 19 through the conduit 28 flows outwardly into the conduit 31' and thence through the conduit 26' into the cylinder of the piston 63 as shown in Figure 2 and the clutch 59, 61 is moved into the position for reverse drive, while the clutch 58, 60 is moved and locked into the disengaged position. Thus the braking mechanism operates with equal effectiveness whether the vehicle is moving forward or in reverse at the time that the braking effect is applied.

When the vehicle is not in motion the clutch selector valve 19a is held in the central or neutral position by the balanced springs shown within the housing 19 and bearing against the valve 19a. In this central position the conduits 31 and 31', which are connected with the cylinders of the control piston for the clutches, are connected with the discharge through the conduits 33 and 34, respectively, each of which communicates with the housing 17 of the valve 17'.

If the engine, after the braking operation has been carried out, is to be started again, which will require the moving of the fuel lever 7 from the stop position H to or toward the idling position L, the brake lever 16 must first be moved from the position shown in Figure 1 to the neutral position A. When the brake lever 16 is moved from the braking position B to the position A the lower end of the rod 20 is moved out of the notch I in the cam lever 9 and the cam is thus freed to permit movement of the fuel lever 7 to effect feeding of the fuel to the engine. At the same time the valve 17' is moved toward the left from the position shown in Figure 1 to a position in which it blocks movement through the conduits 33 and 34 leading from the clutch selector, and the clutch selector is thus temporarily held out of automatic operation so that the direction of driving is determined by the operator who shifts the reverse lever 13 to the position V or the position R to effect driving in the desired direction and thus also during the shifting of the valve 10 in response to movement of the fuel lever 7 to the position V, running off of the liquid within the control system is prevented.

While in the particular form of the invention shown herewith an internal combustion engine of the Diesel type is indicated, the invention is not limited to such an engine, and a gas or gasoline engine might equally well be used. In other installations steam engines may be used and the application of the present invention to a steam locomotive with high pressure boilers of relatively small capacity and relatively high R. P. M. in driving is particularly advantageous. Thus the invention may be used in connection with a locomotive having any desired power source and it is not limited to use with a Diesel engine or any injection engine.

While the transmission of the control device and of the clutch operating mechanism shown herewith is hydraulic the invention is not limited to a hydraulic transmission.

I claim:

1. In combination in a vehicle having a driving engine, running gear and selective transmission mechanism, whereby the running gear is driven from the engine in forward or reverse movement, a clutch for forward driving and a clutch for reverse driving, a fuel control, a direction governing control and a braking control, and a hydraulic system operative in response to the three controls just mentioned to maintain the connection of the clutch which corresponds to the driving direction when the braking control is operated.

2. In combination in a vehicle having a driving engine, running gear and selective transmission mechanism, whereby the running gear is driven from the engine in forward or reverse movement, a clutch for forward driving and a clutch for reverse driving, a fuel control, a direction governing control and a braking control, and a hydraulic system operative in response to the three controls just mentioned to maintain the connection of the clutch which corresponds to the driving direction when the braking control is operated, said means acting to block out the clutch for the other driving direction.

3. In combination in a vehicle having a driving engine, running gear and selective transmission mechanism, whereby the running gear is driven from the engine in forward or reverse movement, a clutch for forward driving and a clutch for reverse driving, a fuel control, a direction governing control and a braking control, and a hydraulic system operative in response to the three controls just mentioned to maintain the connection of the clutch which corresponds to the driving direction when the braking control is operated and to hold the fuel valve in non-feeding position during the braking operation.

4. In combination in a vehicle having a driving engine, running gear and selective transmission mechanism, whereby the running gear is driven from the engine in forward or reverse movement, a clutch for forward driving and a clutch for reverse driving, a fuel control, a direction governing control and a braking control, and a hydraulic system operative in response to the three controls just mentioned to maintain the connection of the clutch which corresponds to the driving direction when the braking control is operated, said means acting to block out the clutch for the other driving direction, and to hold the fuel valve in non-feeding position during the braking operation.

5. In combination in a vehicle having a driving engine, running gear and selective means connecting the engine with the running gear whereby the latter is driven in forward or reverse direction, and means for utilizing the engine as a brake, said means comprising two clutches, one for forward and the other for reverse movement, and a clutch control in combination with a fuel control member and a brake control member, so associated that when the fuel control member is moved to cut off fuel supply to the engine and the brake control member is moved to braking position the two are locked together, the fuel control member cannot be moved until the brake control member is moved to unbraking position, and automatic means associated with the brake control member whereby the clutch corresponding to the direction of movement is automatically maintained in the same driving connection upon operation of the brake control member after movement of the fuel control member to the no-feed position.

6. In combination in a vehicle having a driving engine, running gear and selective means connecting the engine with the running gear whereby the latter is driven in forward or reverse direction, and means for utilizing the engine as a brake, said means comprising two clutches, one for forward and the other for reverse movement, and a direction governing control in combination with a fuel control member and a brake control member, so associated that when the fuel control member is moved to cut off fuel supply to the engine and the brake control member is moved to braking position the two are locked together, the fuel control member cannot be moved until the brake control member is moved to unbraking position, and automatic means associated with the brake control member whereby the clutch corresponding to the direction of movement is automatically maintained in the same driving connection upon operation of the brake control member after movement of the fuel control member to the no-feed position, said fuel control member comprising a slotted cam plate and said brake control member provided with a part engaging a slot of said cam plate.

7. In combination in a vehicle having a driving engine, running gear and selective means connecting the engine with the running gear whereby the latter is driven in forward or reverse direction, and means for utilizing the engine as a brake, said means comprising two clutches, one for forward and the other for reverse movement, and a direction governing control in combination with a fuel control member and a brake control member, so associated that when the fuel control member is moved to cut off fuel supply to the engine and the brake control member is moved to braking position the two are locked together, the fuel control member cannot be moved until the brake control member is moved to unbraking position, and automatic means associated with the brake control member whereby the clutch corresponding to the direction of movement is automatically maintained in the same driving connection upon operation of the brake control member after movement of the fuel control member to the no-feed position, said fuel control member comprising a slotted cam plate and said brake control member provided with a part engaging a slot of said cam plate, the fuel control member being thus held against movement by the engagement of the said brake control member with the slot in the said cam plate.

8. In combination in a vehicle having a driving engine, running gear and selective means connecting the engine with the running gear whereby the latter is driven in forward or reverse direction, and means for also utilizing the engine as a brake, said means comprising two clutches, one for forward and the other for reverse movement, and a direction governing control in combination with a fuel control member and a brake control member, so associated that when the fuel control member is moved to cut off fuel supply to the engine and the brake control member is moved to braking position the two are locked together, the fuel control member cannot be moved until the brake control member is moved to unbraking position, and automatic means associated with the brake control member control whereby the clutch corresponding to the direction of movement is automatically maintained in the same driving connection upon operation of the brake control member after movement of the fuel control member to the no-feed position, and means moved by said fuel control member and a part moved by said brake control member, the two co-operating to lock the fuel control member against movement to the feeding position when the brake control member is in braking position.

9. A vehicle having an internal combustion engine and running gear, transmission means between the gear and the engine whereby the gear is driven in forward or reverse, and separate clutch means for each direction of driving, by means of which the engine is also used for braking, in combination with a braking means, characterized by a control assembly including a blocking device which, upon the operation of the braking means, automatically holds in engagement that clutch which corresponds to the direction of movement and blocks the other clutch into disengaging position.

10. A vehicle in accordance with claim 9, characterized by the fact that the blocking device prevents movement of the braking device while fuel is being fed to the engine and prevents feeding of fuel while the braking device is in position to effect braking by the engine.

11. The vehicle of claim 9, characterized by the fact that a power accumulator is provided in the control assembly to maintain the operation of the blocking device and the braking means, irrespective of stopping of the engine.

12. The vehicle of claim 9, characterized by the fact that an auxiliary means is provided which carries out the operation of the blocking device for the continued connection of the braking means when the engine is stopped.

13. The vehicle of claim 9, characterized by the fact that a power accumulator is provided in the control assembly and further characterized by the fact that the controlling assembly includes hydraulic operating means including an elastically loaded pressure accumulator, which maintains the operation of the blocking device for the continued connection of the braking means irrespective of the stoppage of the engine.

14. The vehicle of claim 9, characterized by the fact that the blocking device includes a pressure operated part.

15. The device of claim 9, characterized by the fact that the control assembly includes a fluid pressure operating means for the blocking device.

16. In combination in a locomotive control system, a brake control member, a direction control member and a fuel control member, the latter including a slotted cam member, the two former including parts engaged within slots of said slotted cam member.

17. In combination in a locomotive control system, a brake control member, a direction control member and a fuel control member, the latter including a slotted cam member having two generally parallel slots, a notch in one of them and parts associated with said brake and direction control members lying within said slots, the brake control member adapted in one position of the cam member to fit within said notch to lock the cam member against movement and in another position of said cam member lying within one of said slots and being itself thereby held against movement to the braking position.

18. In combination in a vehicle having a driving engine, running gear and selective transmission mechanism, whereby the running gear is driven from the engine in forward or reverse movement, a clutch for forward driving and a clutch for reverse driving, a fuel control, a direction governing control and a braking control, and a control system operative in response to the three controls just mentioned to maintain the connection of the clutch which corresponds to the driving direction when the braking control is operated.

19. In combination in a vehicle having a driving engine, running gear and selective transmission mechanism, whereby the running gear is driven from the engine in forward or reverse movement, a clutch for forward driving and a clutch for reverse driving, a fuel control, a direction governing control and a braking control, and a control system operative in response to the three controls just mentioned to maintain the connection of the clutch which corresponds to the driving direction when the braking control is operated, said means acting to block out the clutch for the other driving direction.

20. In combination in a vehicle having a driving engine, running gear and selective transmission mechanism, whereby the running gear is driven from the engine in forward or reverse movement, a clutch for forward driving and a clutch for reverse driving, a fuel control, a direction governing control and a braking control, and a control system operative in response to the three controls just mentioned to maintain the connection of the clutch which corresponds to the driving direction when the braking control is operated and to hold the fuel valve in non-feeding position during the braking operation.

EDOUARD ATTESLANDER.